US010063522B2

(12) United States Patent
Hellum et al.

(10) Patent No.: US 10,063,522 B2
(45) Date of Patent: Aug. 28, 2018

(54) SYSTEM AND METHOD FOR OPERATING A SAFETY-CRITICAL DEVICE OVER A NON-SECURE COMMUNICATION NETWORK

(71) Applicant: Kongsberg Defence & Aerospace AS, Kongsberg (NO)

(72) Inventors: Pal Longva Hellum, Blommenholm (NO); Per Erik Moldskred Nilssen, Drammen (NO); Oddgeir Austad, Oslo (NO)

(73) Assignee: KONGSBERG DEFENCE & AEROSPACE AS, Kongsberg (NO)

(*) Notice: Subject to any disclaimer, the term of this patent is extended or adjusted under 35 U.S.C. 154(b) by 0 days.

(21) Appl. No.: 14/762,599

(22) PCT Filed: Jan. 24, 2014

(86) PCT No.: PCT/EP2014/051373
§ 371 (c)(1),
(2) Date: Jul. 22, 2015

(87) PCT Pub. No.: WO2014/114736
PCT Pub. Date: Jul. 31, 2014

(65) Prior Publication Data
US 2015/0372985 A1 Dec. 24, 2015

Related U.S. Application Data

(63) Continuation of application No. 13/968,550, filed on Aug. 16, 2013.

(30) Foreign Application Priority Data

Jan. 25, 2013 (NO) .................... 20130142

(51) Int. Cl.
*H04L 29/06* (2006.01)
*H04L 29/08* (2006.01)
(Continued)

(52) U.S. Cl.
CPC .............. *H04L 63/04* (2013.01); *F41A 17/06* (2013.01); *F41A 19/58* (2013.01); *F41A 27/28* (2013.01);
(Continued)

(58) Field of Classification Search
CPC .. F41A 9/58; F41A 17/02; F41A 17/06; F41A 17/08; F41A 17/22; F41A 17/30;
(Continued)

(56) References Cited

U.S. PATENT DOCUMENTS 4,680,584 A * 7/1987 Newsom ................. F41G 7/007
114/21.1
6,412,207 B1 * 7/2002 Crye ....................... F41A 17/02
42/70.01

(Continued)

OTHER PUBLICATIONS

McMahan, Foreword to Killing by Remote Control, 2012.*
(Continued)

*Primary Examiner* — Hadi S Armouche
*Assistant Examiner* — Huan V Doan
(74) *Attorney, Agent, or Firm* — Young & Thompson

(57) ABSTRACT

A system and method for operating, at a near location, a safety-critical device located at a far location. The system includes a first operating input device to be operated at the near location, providing a first barrier control signal; and a second operating input device to be operated at the near location, providing a second barrier control signal. The first barrier control signal is communicatively connected to a near end of a first secure communication tunnel through the non-secure communication network, and the second barrier (Continued)

control signal is communicatively connected to a near end of a second secure communication tunnel through the non-secure communication network. A far end of the first secure communication tunnel is communicatively connected to an activating input of a first barrier circuit, and a far end of the second secure communication tunnel is communicatively connected to an activating input of a second barrier circuit.

18 Claims, 14 Drawing Sheets

(51) Int. Cl.
- *F41A 19/58* (2006.01)
- *F41A 27/28* (2006.01)
- *F41A 17/06* (2006.01)

(52) U.S. Cl.
CPC ........ *H04L 63/029* (2013.01); *H04L 63/0272* (2013.01); *H04L 63/0428* (2013.01); *H04L 63/0869* (2013.01); *H04L 63/164* (2013.01); *H04L 63/18* (2013.01); *H04L 67/125* (2013.01)

(58) Field of Classification Search
CPC .......... F41A 17/40; F41A 17/46; F41A 17/72; F41A 17/82; F41A 19/20; F41A 19/58; F41A 27/28; F41H 7/005; H04L 29/06; H04L 29/08
See application file for complete search history.

(56) References Cited

U.S. PATENT DOCUMENTS

| | | | |
|---|---|---|---|
| 6,751,729 B1* | 6/2004 | Giniger | H04L 63/0272 713/153 |
| 8,109,191 B1 | 2/2012 | Rudakevych et al. | |
| 2004/0050240 A1* | 3/2004 | Greene | F41G 3/06 89/41.06 |
| 2006/0249010 A1 | 11/2006 | John et al. | |
| 2008/0020354 A1* | 1/2008 | Goree | F41A 17/06 434/11 |
| 2008/0121097 A1* | 5/2008 | Rudakevych | F41A 19/58 89/28.05 |
| 2009/0120275 A1* | 5/2009 | Chukwu | F41A 19/58 89/41.05 |
| 2010/0263524 A1* | 10/2010 | Morin | F41A 23/34 89/27.12 |
| 2010/0269674 A1* | 10/2010 | Brown | G08B 15/00 89/1.11 |
| 2010/0278086 A1* | 11/2010 | Pochiraju | H04W 28/20 370/310 |

OTHER PUBLICATIONS

Varanelli, A Multi-Weapon Auto Aiming and Trigger System for Rapidly Deployable Armed Support Robots, 2010, Worcester Polytechnic Institute, 61 pages.*
Crane, HAMMER Remotely-Operated Weapons System for Robotic and Manned Vehicles, 11 pages (Year: 2009).*
International Search Report, dated May 23, 2014, from corresponding PCT application.
Norwegian Search Report, dated Aug. 20, 2013, from corresponding NO application.

* cited by examiner

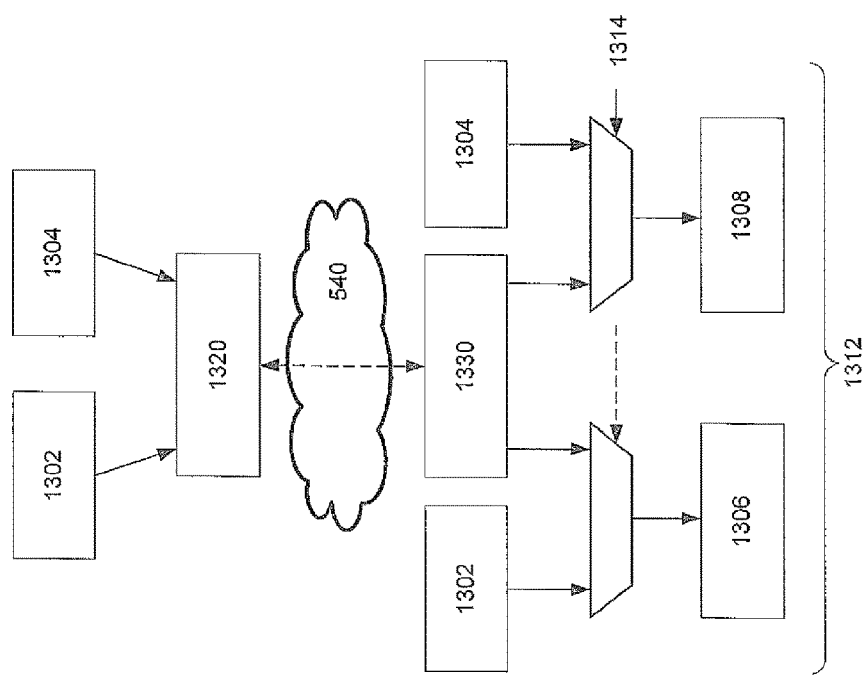
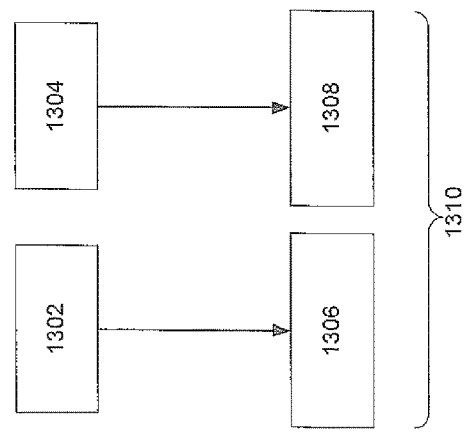
Fig. 13

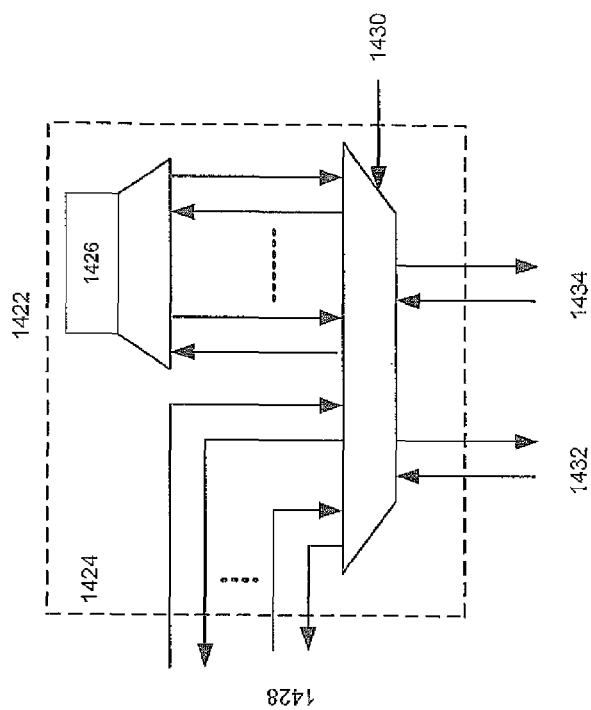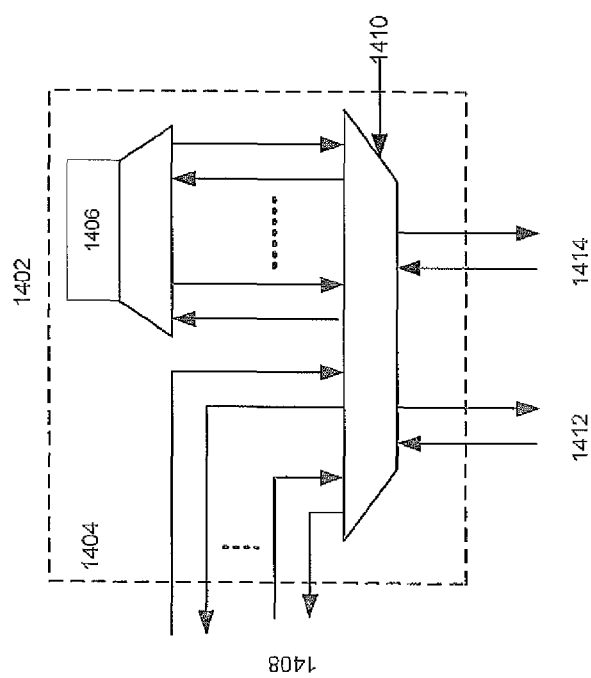
Fig. 14

SYSTEM AND METHOD FOR OPERATING A SAFETY-CRITICAL DEVICE OVER A NON-SECURE COMMUNICATION NETWORK

FIELD OF THE INVENTION

The present invention relates to a system and method for operating a safety-critical device over a non-secure communication network.

BACKGROUND OF THE INVENTION

The defense industry is moving towards standardized platforms and infrastructures. In these platforms all systems are required to interoperate over packet based networks. The operator positions become multipurpose operator positions shared between several systems. The interface between the system and the operator positions thus changes.

Similar requirements are also present in other safety critical application fields.

Hence, there is a need for a system and method for providing a method and system for operating, at a near location, a safety-critical device located at a far location.

In particular, there is a need for such a system and method which may utilize certain aspects of already existing, hard-wired solutions, fulfil relevant safety requirements, provide a secure, tamper proof and supervised connection, and which make use of standard protocols and networking elements.

SUMMARY OF THE INVENTION

The invention is defined by the appended claims.

BRIEF DESCRIPTION OF THE DRAWINGS

FIG. 13 is a schematic block diagram illustrating aspects relating to the modification of a previous system to include principles of the invention.

FIG. 14 is a schematic block diagram illustrating two barrier multiplexers.

DETAILED DESCRIPTION OF THE INVENTION

Figure 1:
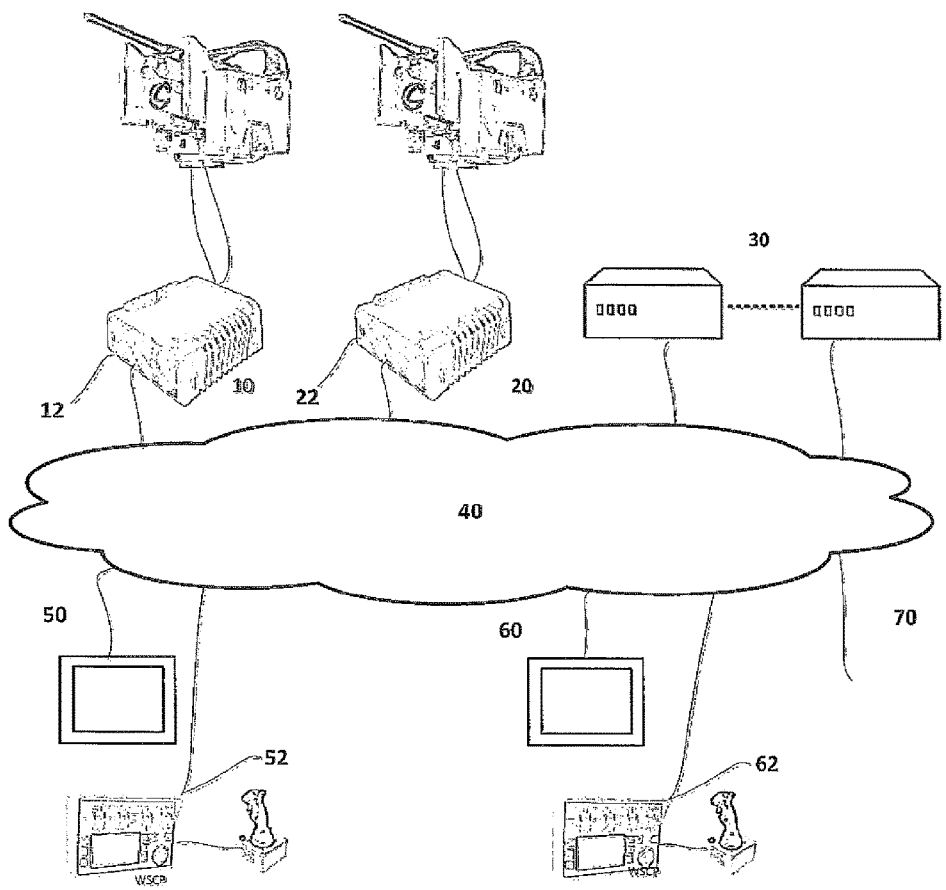
FIG. 1 is a schematic block diagram illustrating is a schematic block diagram illustrating a context wherein the disclosed system and method principles may be used.

FIG. 1 is a schematic block diagram illustrating an exemplary context wherein the presently disclosed system and method may be employed.

Remotely controllable weapon stations, each including a power device, MPU, 10, 20 have been illustrated as examples of safety-critical devices located at a far location. Power inputs to MPU's 10, 20 are shown at 12, 22, respectively.

A gunner station 50 and a commander station 60 have been illustrated as examples of operating stations at a near location, to be operated by an operator. Each operating station includes operating input devices, e.g. weapon firing circuitry and/or weapon movement circuitry. 52 and 62 denote power.

A network 40. e.g. a vehicle network, has been schematically illustrated for providing communication between the near and far locations.

70 denotes crew display, connected to the network 40. 30 denotes other equipment connected to the network 40.

Some possible advantageous features of the presently disclosed method and system include:

User arbitration: The controlling user (operator) of each weapon station should advantageously be established, and the system should advantageously be safe with respect to intentional tampering and unintentional user access.

Video distribution: The controlling user (operator) should advantageously be able to see and control video data captured at a weapon station, and the system should advantageously be safe and therefore have a positive confirmation that the user (operator) is viewing the correct video source if safety critical operations are to be allowed.

Movement: The controlling user (operator) should advantageously be able to safely move the weapon station, and the weapon station must be safe with respect to unintended movements.

Firing: The controlling user (operator) should be able to fire the weapons, and the weapon station should be safe with respect to unintended fire.

Otherwise the system may advantageously allow:

A monitoring user to view any video source.

The screens to be used for multiple purposes.

The communication between the near and far locations to be packet based communication.

Figure 2:
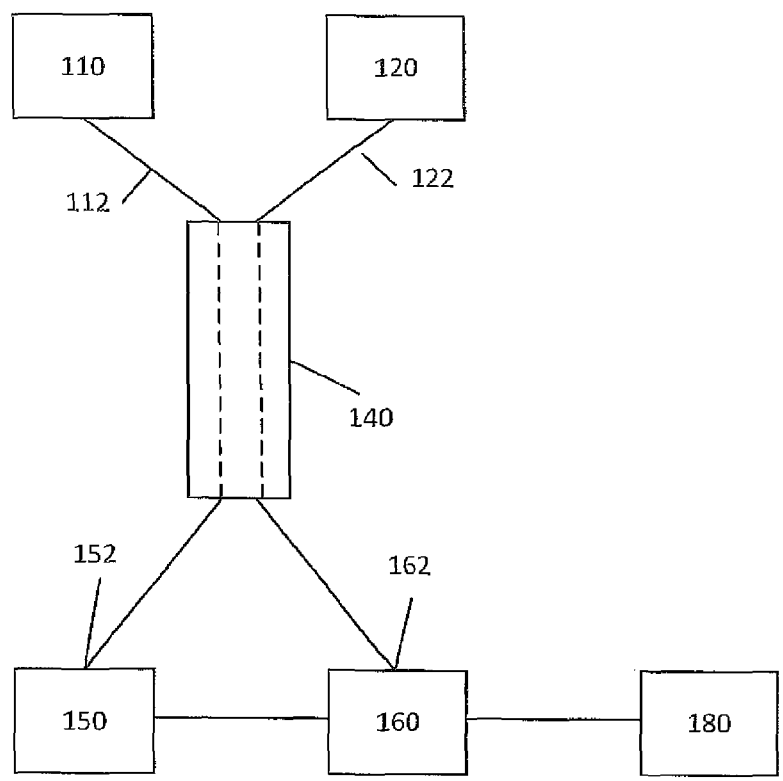
FIG. 2 is a schematic block diagram illustrating an exemplary system employing basic principles of the invention.

FIG. 2 is a schematic block diagram illustrating an exemplary system employing basic principles of the invention.

The system 100 is a system for operating, at a near location, a safety-critical device 180 located at a far location.

The safety-critical device 180 may, e.g., be a weapon firing circuitry or a weapon movement circuitry, although alternatives exist.

Figure 3:
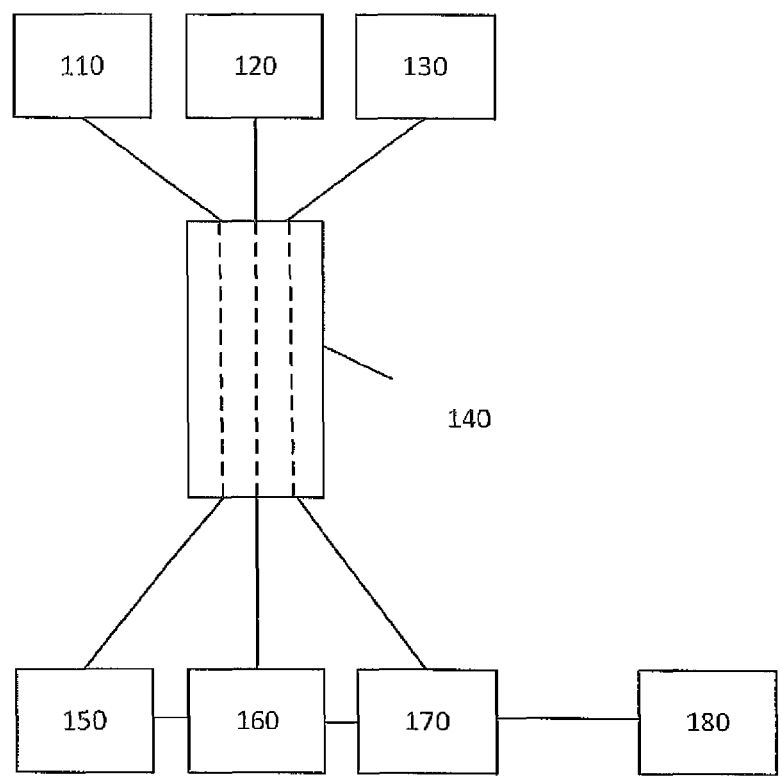
FIG. 3 is a schematic block diagram illustrating an exemplary system employing further principles of the invention

The upper part of FIG. 2 represents the near location and the lower part of FIG. 3 represents the far location.

The system comprises a first operating input device 110 to be operated at the near location by an operator, providing a first barrier control signal 112. The system further comprises a second operating input device 120 to be operated at the near location by an operator, providing a second barrier control signal 122.

Each operating input device 110, 120 may be, e.g., a weapon fire control device or a weapon movement control device, although alternatives exist.

The first 110 and second 120 operating input devices may be arranged to be operated by the same operator or by different operators.

Further in the system, the first barrier control signal 112 is communicatively connected to a near end of a first secure communication tunnel through a non-secure communication network 140.

Likewise, the second barrier control signal 122 is communicatively connected to a near end of a second secure communication tunnel through the non-secure communication network 140.

A far end of the first secure communication tunnel is communicatively connected to an activating input 152 of a first barrier circuit 150. Correspondingly, a far end of the second secure communication tunnel is communicatively connected to an activating input 162 of a second barrier circuit 160.

The first 150 and second 160 barrier circuits are configured to enable operation of the safety-critical device 180 when both the first 150 and second 160 barrier circuits are activated.

Advantageously, separate hardware circuits are used for implementing the first 150 and second 160 barrier circuits.

In a particular aspect, not illustrated in FIG. 2, the system may be configured for operating, at a near location, a plurality of safety-critical devices such as the safety critical device 180, located at the far location. In such an aspect, the system may further comprise a first multiplexer which is multiplexes a plurality of first barrier control signals onto the first secure communication tunnel through the non-secure communication network 140. Further, the system may comprise a second multiplexer, multiplexing a plurality of second barrier control signals onto the second secure communication tunnel through the non-secure communication network. Further in this multi-safety-critical device aspect, the first barrier circuit 150 may including a first demultiplexer, and the second barrier circuit 160 may include a second demultiplexer. More detailed features relating to this aspect has been explained with reference to FIG. 14 below.

The non-secure communication network 140 may advantageously be a packet based communication network, such as an Internet Protocol (IP) network. Each of the secure communication tunnels may be an IPsec tunnel. The IPsec tunnel may be configured in an integrity only mode. Advantageously, the system may be configured with a fixed IP addressing scheme.

Advantageously, the communication through the secure communication tunnel employs a protocol which includes time-stamping of data. Such aspects have been explained in closer detail i.a. with reference to FIG. 8 below.

In a particular aspect, an operating input device may include a video session information device, and the safety-critical device may be a video confirmation device. In this aspect, the system may further comprise (not illustrated in FIG. 2) a video distribution device. The video distributing device is arranged to provide a video signal which is transferred through the non-secure communication network and displayed on a display screen at the near end. Further, the video session information device may be configured to derive video session information from the video signal and transfer the video session information through the secure communication tunnel. Also, the video confirmation device may be configured to confirm the authenticity of the video signal transferred through the non-secure communication network. These aspects of a video session information device have been explained in closer detail, i.a. with reference to FIG. 5 and FIG. 12 below.

FIG. 3 is a schematic block diagram illustrating an exemplary system employing further principles of the invention.

The system illustrated in FIG. 3 corresponds to the system illustrated and described with reference to FIG. 2 with some additional features described in the following: The system illustrated in FIG. 3 further includes a third operating input device 130 to be operated at the near location by an operator. The third input device 130 provides a third barrier control signal which is connected to a near end of a third secure communication tunnel through the non-secure communication network 140. A far end of the third secure communication tunnel is connected to an activating input of a third barrier circuit 170. In this system, the first 150, the second 160 and the third 170 barrier circuits are configured to enable operation of the safety-critical device 180 when both the first 150, second 160 and third 170 barrier circuits are activated.

It should be appreciated that additional operating devices and barrier devices may be included in the system. Each barrier device provides the possibility to stop the execution of a function, or said another way—functions the user must activate to enable the use of the safety critical device.

The barriers should advantageously be independent so as to reduce the possibilities of common faults disabling multiple barriers.

Each barrier device may include a barrier control and a barrier circuit. The barrier control is the input from the user used to disable/activate the barrier. The barrier circuit is the actual circuit blocking/opening the use of the safety critical function. In the system illustrated in FIG. 2, two barrier controls must be activated, with the result that both barrier circuits are opened—thus enabling the use of the safety critical function. In the system illustrated in FIG. 3, three barrier controls must be activated, with the result that all 3 barrier circuits are opened—thus enabling the use of the safety critical function.

Figure 4:
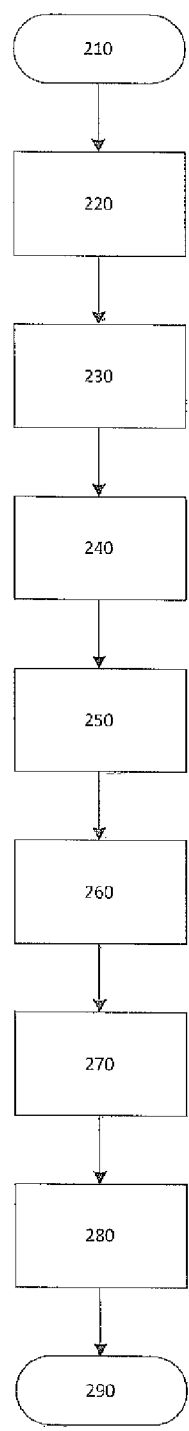
FIG. 4 is a schematic flowchart illustrating principles of a method according to the invention.

FIG. 4 is a schematic flowchart illustrating principles of a method according to the invention. The illustrated method is a method for operating, at a near location, a safety-critical device located at a far location. The safety-critical device may, e.g., be a weapon firing circuitry or a weapon movement circuitry, although alternatives exist.

The method starts at the initiating step 210. First, in step 220, a first barrier control signal is provided from a first operating input device to be operated at the near location by an operator.

Next, in step 230, a second barrier control signal is provided from a second operating input device to be operated at the near location by an operator. Each operating input device may be, e.g., a weapon fire control device or a weapon movement control device, although alternatives exist.

Further, in step 240, the first barrier control signal is communicated to a near end of a first secure communication tunnel through the non-secure communication network.

Likewise, in step 250, the second barrier control signal is communicated to a near end of a second secure communication tunnel through the non-secure communication network.

In step 260, a signal is communicated from a far end of the first secure communication tunnel to an activating input of a first barrier circuit.

Likewise, in step 270, signal is communicated from a far end of the second secure communication tunnel to an activating input of a second barrier circuit.

Then, in step 280, operation of the safety-critical device is enabled by the first and second barrier circuits when both the first and second barrier circuits are activated.

It will be understood that the illustrated method largely corresponds to the system explained with reference to, i.a., FIGS. 2 and 3 above. Hence, the optional or additional features described with reference to the system may also have their counterpart as optional or additional features of the method.

In an aspect, the method may further comprise steps (not illustrated, but corresponding to the additional system features explained with reference to FIG. 3 above) of providing a third barrier control signal by a third operating input device to be operated at the near location by an operator, communicating the third barrier control signal to a near end of a third secure communication tunnel through the non-secure communication network, communicating, from a far end of the third secure communication tunnel, a signal to an activating input of a third barrier circuit, and enabling, by the first, second and third barrier circuits, operation of the safety-critical device when both the first, second and third barrier circuits are activated.

Separate hardware circuits may advantageously be used for implementing the first and second barrier circuits.

In a particular aspect, the method may be adapted for operating, at a near location, a plurality of safety-critical devices located at the far location. In such a case the method may further comprise multiplexing, by a first multiplexer, a plurality of first barrier control signals onto the first secure communication tunnel through the non-secure communication network, and multiplexing, by a second multiplexer, a plurality of second barrier control signals onto the second secure communication tunnel through the non-secure communication network. In this aspect the first barrier circuit may include a first demultiplexer, and the second barrier circuit may include a second demultiplexer.

The non-secure communication network 140 may advantageously be a packet based communication network, such as an Internet Protocol (IP) network. Each of the secure communication tunnels may be an IPsec tunnel. The IPsec tunnel may be configured in an integrity only mode. Advantageously, the system may be configured with a fixed IP addressing scheme.

Advantageously, the communication through the secure communication tunnel employs a protocol which includes time-stamping of data. Such aspects have been explained in closer detail, i.a. with reference to FIG. 8 below.

In a particular aspect, an operating input device may include a video session information device, and the safety-critical device may be a video confirmation device. In this aspect, the method may further comprise providing, by a video distribution device, a video signal which may be transferred through the non-secure communication network. The video signal may be displayed on a display screen at the near end. The method may further include deriving, by the video session information device, video session information from the video signal and transferring the video session information through the secure communication tunnel. Then the authenticity of the video signal may be confirmed by the video confirmation device. Certain aspects associated with a video session information device have been explained in closer detail, i.a. with reference to FIG. 5 and FIG. 12 below.

Figure 5:
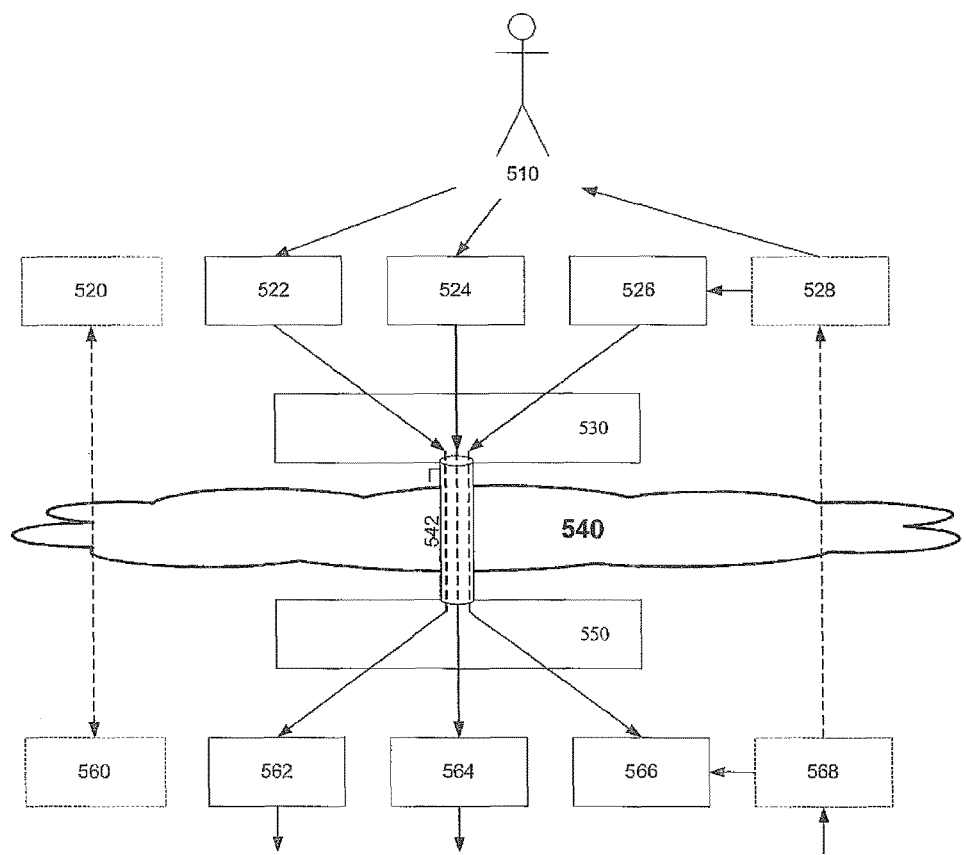
FIG. 5 is a schematic block diagram illustrating an exemplary system employing principles of the invention, including safety related blocks and video session identification.

FIG. 5 is a schematic block diagram illustrating an exemplary system employing further principles of the invention, including safety related blocks and video session identification.

A user or operator 510 is established as a controlling user through the establishment of an IPsec tunnel 542. Each device to be controlled has one (or zero) tunnel and can thus only have one controlling user.

A user 510 has a set of operating input devices, e.g. for movement and firing purposes. Signals provided by the operating input devices are transported over the IP/Ethernet network 540 by the safety over packet module and thus interfaces to the remote remote weapon station (RWS) which includes corresponding firing and movement circuitry.

It should be understood that the IP/Ethernet network 540 referred to in e.g. FIGS. 5, 6, 11, 12 and 13 and the remaining description, may be an example of the non-secure communication network 140 referred to previously, in particular with reference to FIGS. 2, 3 and 4.

The video and session identification may be distributed according to some appropriate standard (e.g. DEF-STAN 00.82). The user subscribes to the video and displays it on his screen. The video session identification is fed back to the video confirmation function through the safety over packet modules where it is compared with the local session identification. If they match, the user views the correct video and the safety critical functions like movement and firing have fulfilled one of the safety criteria.

Further reference numerals in FIG. 5 denote the following elements:

520: non safety critical functions, 522: fire control, 524: movement control, 526: video session info, and 528: screen, 530 and 550: safety barriers over packed based networks, 560: non safety critical functions, 562: weapon firing circuitry, 564: weapon movement circuitry, 566: video confirmation, and 568: video distribution.

Figure 6:
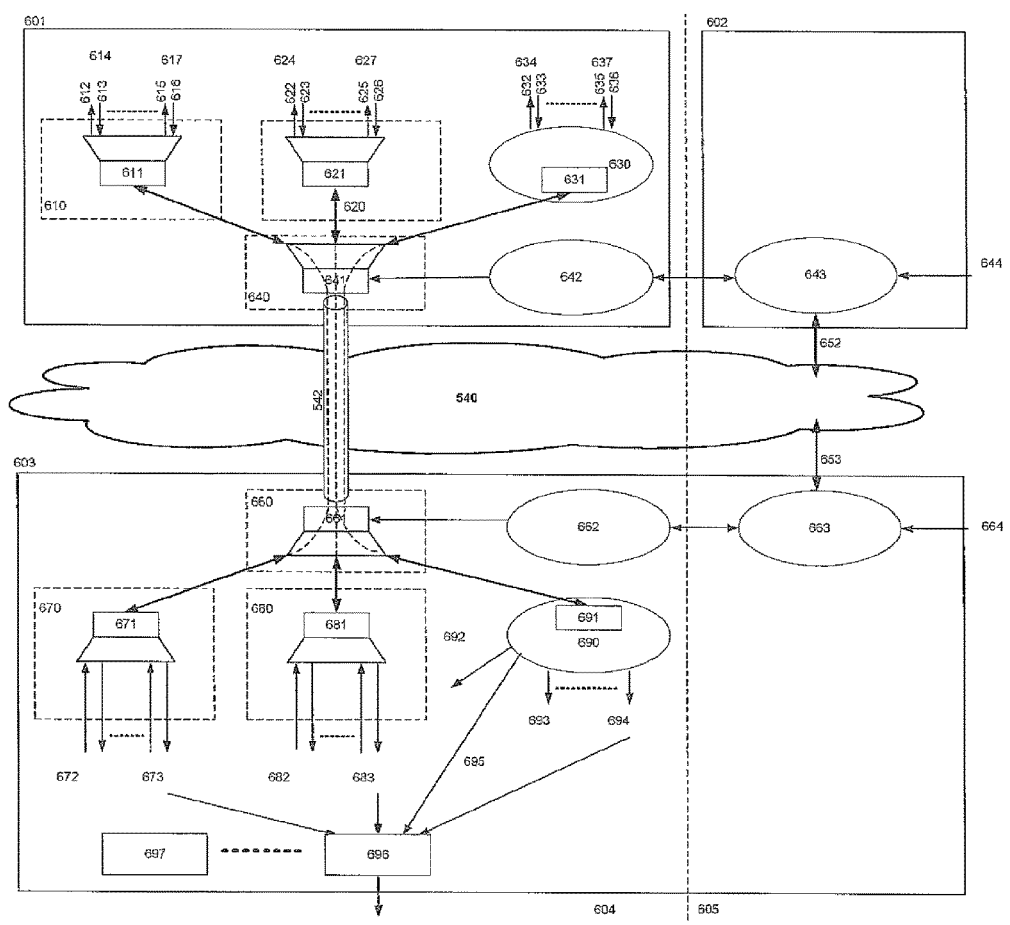
FIG. 6 is a schematic block diagram illustrating an exemplary system employing principles of the invention, including packet based safety barriers.

FIG. 6 is a schematic block diagram illustrating an exemplary system employing principles of the invention, including packet based safety barriers.

Basic Protocols and User Arbitration

The basic structure consists of 2 main blocks, the barrier control transport circuits (BCTC) 610, 620, 670, 680, and the IPsec tunnel 542. In an advantageous embodiment there are normally 3 barriers, which may include two hardware barriers and one software barrier for safety critical functions. These barriers may be implemented and transported in separate circuits with no common logic so that a failure in one may not affect another.

The IPsec tunnel 542 may be a standard tunnel. In an advantageous embodiment it may be an integrity only tunnel which may be established through a standard Diffi-Hellman based key exchange over the non-safety critical Ethernet IP interface. It can however be any type of IPsec tunnel as long as it is tamper proof.

User arbitration may be achieved by the movement or re-establishment of the IPsec tunnel 542. The IPsec association between a WSCP 601 and an MPU establishes that position as a controlling user.

In FIG. 6, the further reference numerals denote the following elements:

540: IP/Ethernet, 542 IPsec tunnel, 601: WSCP #n, 602: WSCP/Display #n, 603: Weapon Station #m, 604: Safety critical, 605: Non Safety critical, 610: Barrier Control Transport Circuit #1, 611: RTP/UDP IP addr x 1, 612: stat, 613: inp, 614: Weapon n Barrier Ctrl. 1, 615: stat, 616: inp, 617: Weapon 1 Barrier Ctrl. 1, 620: Barrier Control Transport Circuit #2, 621: RTP/UDP IP addr x2, 622: stat, 623: inp, 624: Weapon n Barrier Ctrl. 2, 625: stat, 626: inp, 627: Weapon 1 Barrier Ctrl. 2, 630: SW, 631: TCP IP addr x3, 632: stat, 633: inp, 634: Weapon n Barrier Ctrl. 3, 635: stat, 636: inp, 637: Weapon 1 Barrier Ctrl. 3, 640: IPsec Circuit, 641: IPsec tunnel, 642 CTRL SW, 643: SW, 644: Box ID #11, 652: DDS/IP, 653: DDS/IP, 660: IPsec Circuit, 661: IPsec tunnel, 662: CTRL SW, 663: SW, 670: Barrier Control Transport Circuit #1, 671: RTP/UDP IP addr y1, 672: Weapon n Barrier Ctrl. 1, 673: Weapon 1 Barrier Ctrl. 1, 680: Barrier Control Transport Circuit #2, 681: RTP/UDP IP addr y2, 682: Weapon n Barrier Ctrl. 2, 683: Weapon 1 Barrier Ctrl. 2, 690: SW Barrier, 691: TCP IP addr y3, 692: Weapon n Fire break, 693: Weapon n Barrier Ctrl. 3, 694: Weapon 1 Barrier Ctrl. 3, 696: Weapon 1 Firing circuitry, 697: Weapon n Firing circuitry.

Figure 7:
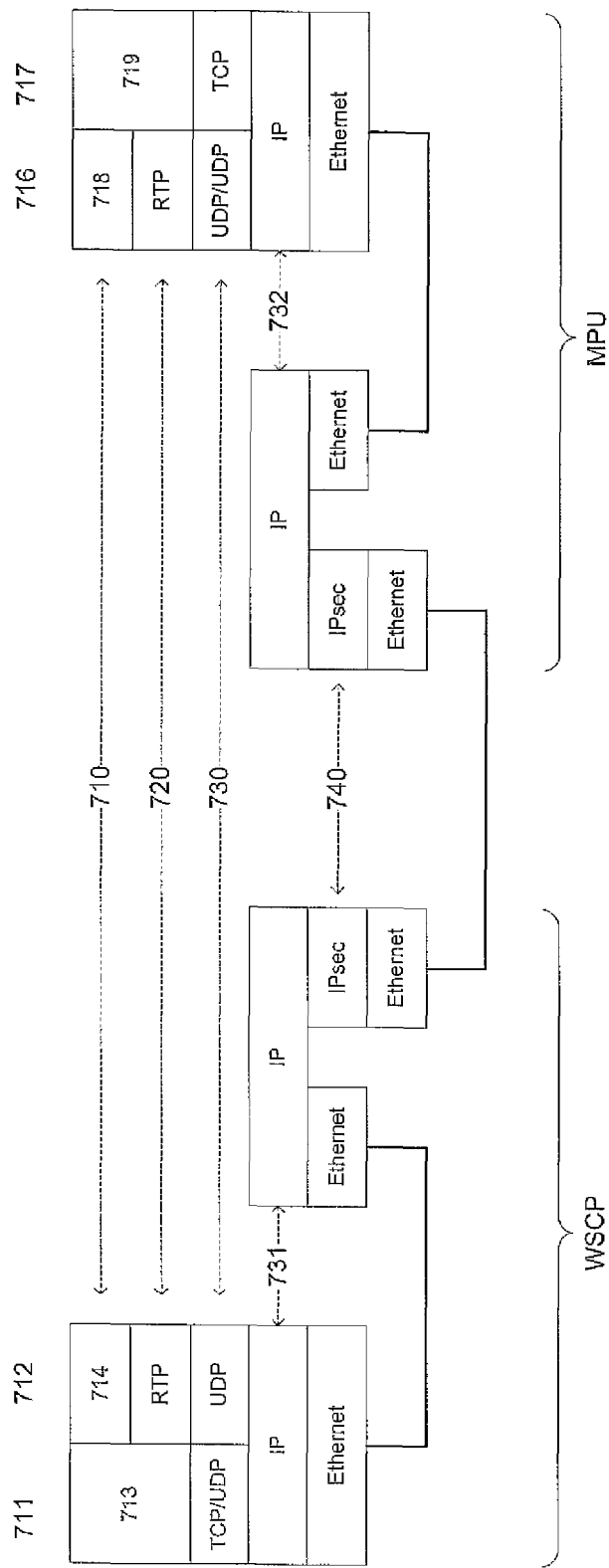
FIG. 7 is a schematic block diagram illustrating an exemplary protocol stack for use in a system or method according to the invention.

FIG. 7 is a schematic block diagram illustrating an exemplary protocol stack for use in a system or method according to the invention.

The IPsec tunnel 542 is established and terminated at each unit (e.g. weapon station control panel, WSCP; main processing unit, MPU). The establishment of this tunnel 542 is following the network addressing scheme—the IP address which is the basis for routing between the units (e.g. WSCP, MPU).

The next layer is the IP layer between the barriers—this is a fixed addressing scheme where each barrier on each side has a fixed address:
WSCP barrier 1: addr x1
WSCP barrier 2: addr x2 · · · ·
MPU barrier 1: addr y1
MPU barrier 2: addr y2 · · · ·

Thus after the IPsec tunnel 542 has been established/moved the MPU barriers will always communicate with the same IP address. This means that the barrier multiplexing scheme in the IPsec module is simple and the design of the HW barriers are static and thus robust.

The RTP/UDP (Real Time Protocol/User Datagram Protocol) is a simple datagram protocol which includes timestamping possibilities. This use is explained later.

Figure 8:
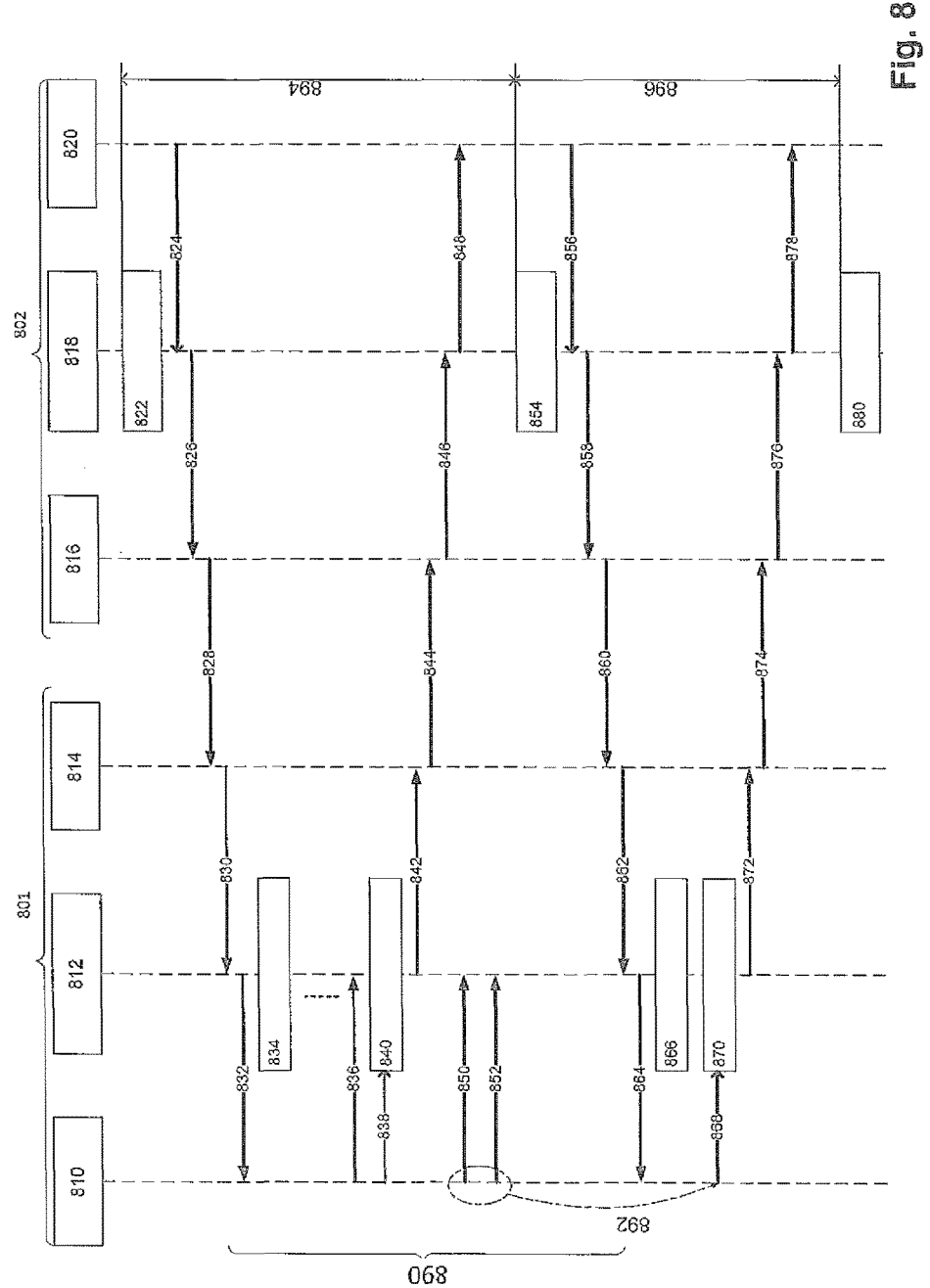
FIG. 8 is a schematic sequence diagram illustrating information transfer in certain aspects of the invention, including time-stamping features.

The reference numerals in FIG. 7 denote the following elements:

710: Transfer of safety critical signals and status, 711: SW barriers, 712: HW barriers, 713: Payload, 714: Payload, 716: HW barriers, 717: SW barriers, 718: Payload, 719: Payload, 720: Timestamping of data, 730: End-to-end payload supervision, 731: Barrier mux, 732: Barrier mux, 740: Network connectivity. FIG. 8 is a schematic sequence diagram illustrating information transfer in certain aspects of the invention, including time-stamping features.

A useful feature of the information transfer is that the main processing unit, MPU, establishes time slots, TS.
  The TS length may be defined by the frequency of barrier request messages from the MPU—denoted by x in FIG. 8.
  The barrier request message provides status information from the MPU.
  Within each timeslot the WSCP provides one message.
  The barrier reply message may be sent at any time during the TS. If an input changes state during the TS the WSCP may immediately send the barrier reply carrying the updated status of all inputs.
  If there are no changes during the TS the WSCP must provide a barrier reply to acknowledge connectivity at the reception of the next TS message (with the status of all inputs, so that the inputs become defined quickly at startup).
  The request contains a running sequence number so that the control panel may verify connectivity.
  The reply contains the sequence no. of the request, thus connectivity may be checked at the MPU.

This procedure may ensure certain advantages, including:
  No perception of absolute time required.
  The bandwidth between the MPU and WSCP may be constant and controllable (by changing the frequency of barrier request messages).
  A change in an input at the WSCP end may be signaled immediately. If 2 or more changes occur within the same TS, then the latest will be delayed on TS.
  The connectivity is supervised at both ends (reception of one message for each TS).

The reference numerals in FIG. 8 denote the following elements:

801: Control panel #B, 802: MPU #A, 810: Control panel HW, 812: Barrier Ctrl. Transport Circuit #1b, 814: IPsec, 816: IPsec, 818: Barrier Ctrl. Transport Circuit #1a, 820: MPU HW, 822: Wait until t=T SNa=n, 824: Current status, 826: Barrier request (SNa, status), 828: Encapsulated message, 830: Barrier request (SNa, status), 832: Currens status, 834: SNb=SNa, 836: Input signal #1 change, 840: Sample current inputs, 842: Barrier reply (SNb, inputs), 844: Encapsulated message, 846: Barrier reply (SNb, inputs), 848: All inputs, 850: input signal #2 change, 852: input signal #3 change, 854: Wait until t=T+x, SNa=n+1, 856: Current status, 858: Barrier Request (SNa, status), 860: Encapsulated message, 862: Barrier request SNa, status, 864: Current status, 866: Snb=SNa, 868: All inputs, 870: Sample current inputs, 872: Barrier reply (Snb, inouts), 874: Encapsulated message, 876: Barrier reply (SNb, inputs), 878: All inputs, 880: Wait until t=T+2x, SNa=n+2, 890: Ts, 892: Trigger immediate reply unpn next request, 894: d=x msec, 896: d=x msec.

Figure 9:
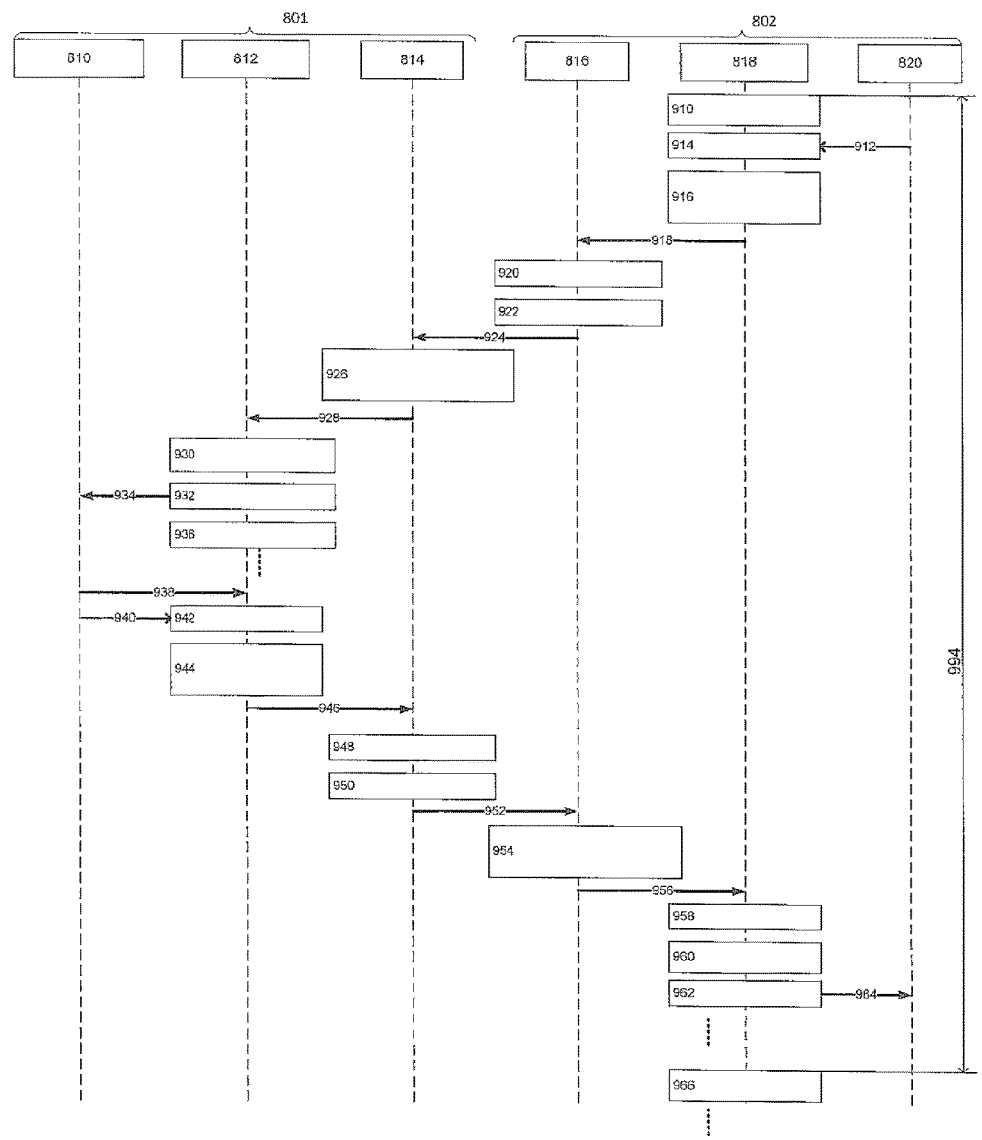
FIG. 9 is a schematic sequence diagram illustrating information transfer in certain aspects of the invention, including hardware barrier supervision.

FIG. 9 is a schematic sequence diagram illustrating information transfer in certain aspects of the invention, including hardware barrier supervision. FIG. 9 illustrates different possible mechanisms involved in the supervision of the information transfer.

The relation to the protocol stack:
  RTP: Verify currentness and End to End connectivity
  UDP: Verify End To End payload integrity
  IP: Verify barrier number multiplexing integrity
  IPsec: Verify authenticity and payload integrity on network segment
  Ethernet: Verify segment integrity
  Frames with any kind of error are advantageously discarded.
  Note also that the concept of sending and receiving one message per TS per HW barrier control transport circuit is advantageous since it also provides the capability to detect loss of frames.

Payload integrity may be verified through:
End to end:
  UDP checksum and IP header checksum
Network connection (IPsec tunnel): IPsec integrity verification Segments (internal HW errors):
BCTC to IPsec circuit: Ethernet CRC verification Information Currentness In safety critical applications it is advantageous to verify that the information provided is current (up to date) so that the system is not acting on outdated information. In a packet based network data may be delayed significantly if the network is congested. Such situations should preferably be detected.

The MPU is basically requesting (barrier request) the WSCP to provide the input signals to the MPU every x msec. (Timeslot). The WSCP must provide the data at the end of the timeslot unless the signal changes state during the timeslot in which case the inputs may be provided immediately.

The MPU provides a Timestamp at each request. The reply must contain the timestamp so that it may be determined that the information is current. If 2 changes occur within one TS then the latter change will be reported at the next interval. The inaccuracy in the determination of currentness therefore determined by the length of the timeslot. The length of the timeslot also determines the accuracy by which frames delayed in the network may be measured.

The size of the timeslot should therefore advantageously be set to match the accuracy by which the currentness of the inputs must be measured.

The size of the timeslot may also determine the constant rate at which frames at transmitted through the network.

The reference numerals in FIG. 9 denote the following elements:

801: Control panel #B, 802: MPU #A, 810: Control panel HW, 812: Barrier Ctrl. Transport Circuit #1b, 814: IPsec, 816: IPsec, 818: Barrier Ctrl. Transport Circuit #1a, 820: MPU HW, 910: Wait until t=T SNa=n, 912: Current status, 914: Sample current status, 916: Encapsulate status RTP (SNa)/UDP/IP(B,A)/Eth, 918: Barrier request (SNa, status), 920: Verify Eth. CRC, 922: Encapsulate in IPsec tunnel, 924: Encapsulated message, 926: Verify Eth. CRC, IPsec Integrity, Verify CRCs: IP Demux barriers on IP addsr., 928: Barrier request (SNa, status), 930: Verify CRCc: Eth, IP, UDP Verify SNa update, 932: Extract status, 934: Current status, 936: SNb=SNa, 938: Input change, 940: All inputs, 942: Sample current inputs, 944: Encapsulate inputs RTP (SNb)/UDP/IP/(A,B), Eth., 946: Barrier reply (SNb, inputs), 948: Verify Eth. CRC, 950: Encapsulate in IPsec tunnel, 952: Encapsulated message, 954: Verify Eth. CRC, IPsec Integrity, Verify CRCs: IP header Demux barriers on IP addsr., 956: Barrier reply (TSb, inputs), 958: Verify CRC: Eth. IP, UDP, 960: If SNb=SNa−1 . . . SNa Tick off connectivity, 962: Extract inpute, 964: All inputs, 966: Wait until t=T+x SNa=n+1, 994: d=x msec.

Figure 10:
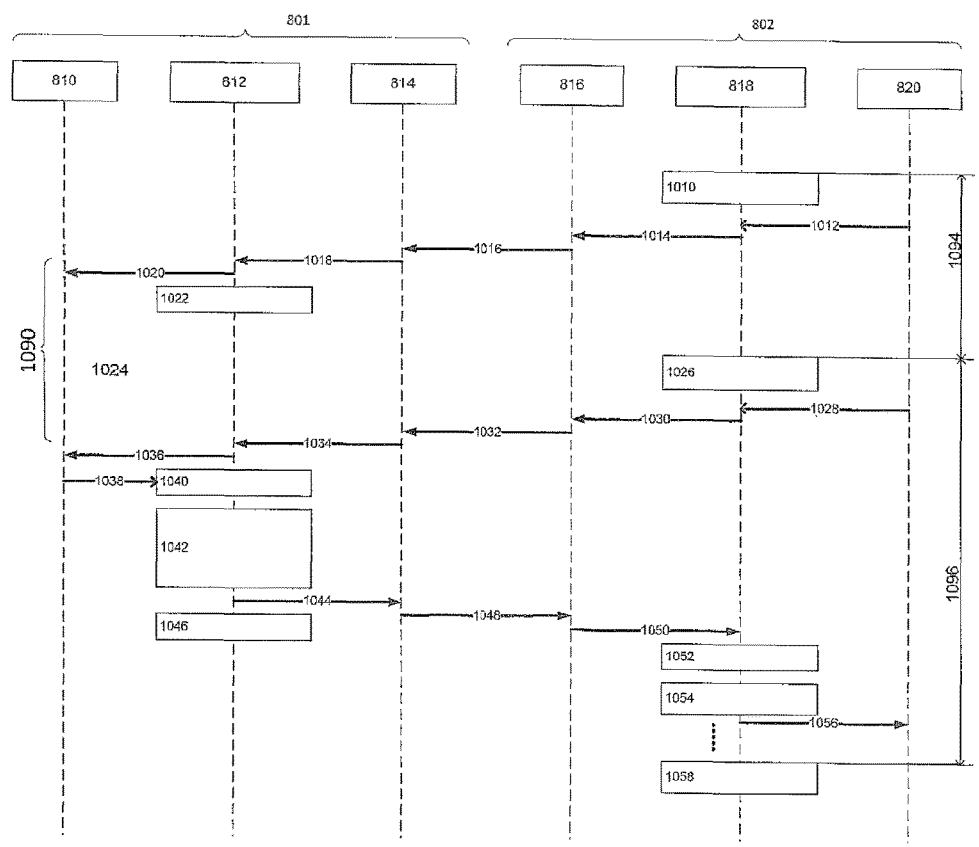
FIG. 10 is a schematic sequence diagram illustrating information transfer in certain aspects of the invention, including connectivity supervision.

FIG. 10 is a schematic sequence diagram illustrating information transfer in certain aspects of the invention, including connectivity supervision.

In safety critical systems it is advantageous to monitor connectivity between the units involved. Loss of connectivity shall render the system in a safe state. This is applied for each barrier so that a detected error places the signals carried by the barrier in a safe state.

The MPU is requesting information at a regular basis (once per timeslot). Each request must be acknowledged through a reply message. The loss of a reply is interpreted as loss of connectivity.

In order to allow for a packet loss in a packet network the number of lost frames may be set to a ratio. Eg: a frame loss of 2 ppm (packets per million) before loss of connectivity is declared. An acceptance for packet loss should advantageously be accompanied by the tolerance for reduced accuracy in the determination for currentness and response to change.

Loss of end to end connectivity for the BCTCs results in the disabling of the affected barriers—thus placing the system in a safe state. Connectivity for the barrier circuits may automatically be reestablished when the packet loss and operation of the barrier circuits have been seen to be correct for a defined period (e.g. 10 msec., 1 sec., 10 sec. . . . ).

In certain aspects the system and method provide the standard detection of loss of carrier on physical interfaces.

Loss if IPsec connectivity may be repaired through a new arbitration sequence from the user.

The reference numerals in FIG. 10 denote the following elements:

801: Control panel #B, 802: MPU #A, 810: Control panel HW, 812: Barrier Ctrl. Transport Circuit #1b, 814: IPsec, 816: IPsec, 818: Barrier Ctrl. Transport Circuit #1a, 820: MPU HW, 1010: Wait until t=T SNa=n, 1012: Current status, 1014: Barrier request (SNa, status), 1016: Encapsulated message, 1018: Barrier request (SNa, status), 1020: Current status, 1022: SNb=SNa, 1024: No change on input signal, 1026: Wait until t=T+x SNa=n+1, 1028: Current status, 1030: Barrier request (SNa, status), 1032: Encapsulated message, 1034: Barrier request (SNa, status), 1036: Current status, 1038: All inouts, 1040: Sample current inputs, 1042: Encapsulate inputs RTP(SNb)/UDP(inputs)/IP/(A,B), Eth., 1044: Barrier reply (TSb, inputs), 1046: SNb=SNa, 1048: Encapsulated message, 1050: Barrier reply (SNb, inputs), 1052: Verify CRC: Eth. IP, UDP, 1054: If SNb=SNa-1 . . . SNa Tick off connectivity, 1056: All inouts, 1058: 966: Wait until t=T+2x SNa=n+2, 1090: TS, 1094: d=x msec, 1096: d=x msec.

Figure 11:
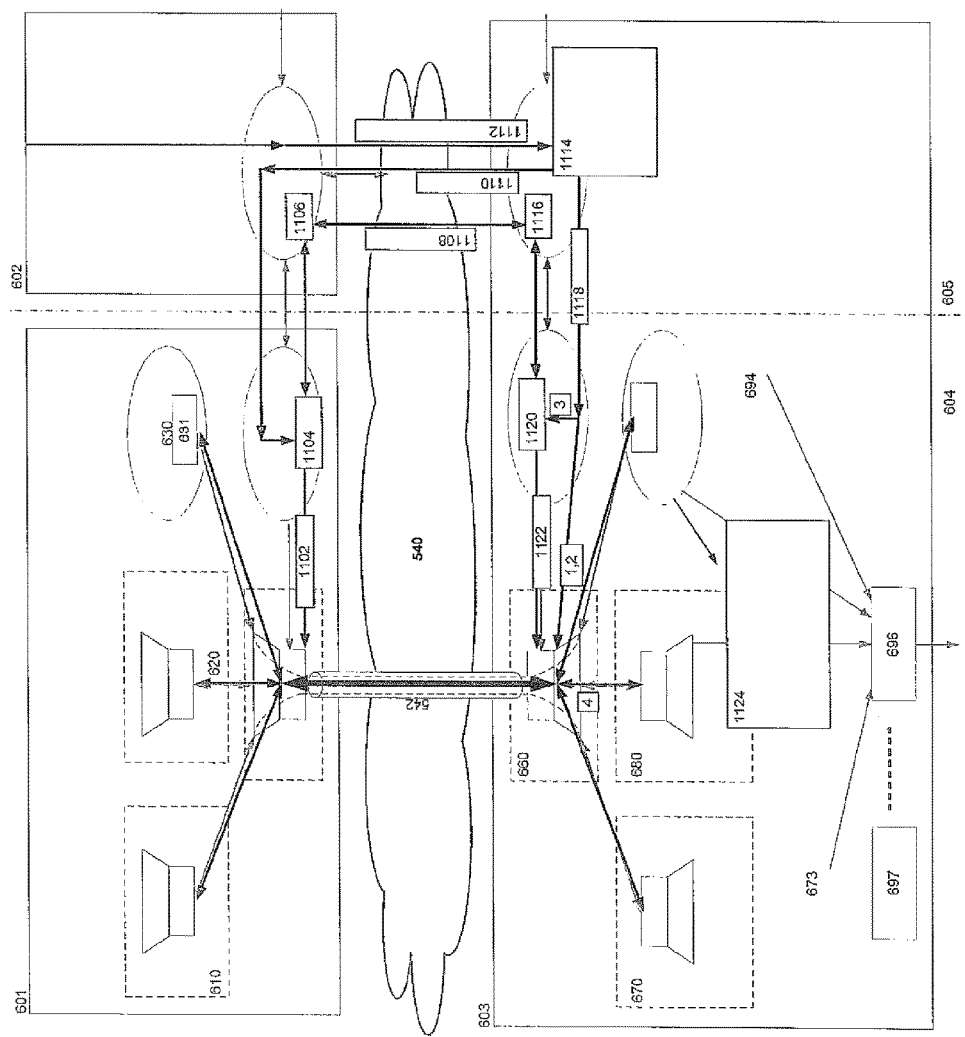
FIG. 11 is a schematic block diagram illustrating an exemplary system employing principles of the invention, including user arbitration features.

FIG. 11 is a schematic block diagram illustrating an exemplary system employing principles of the invention, including user arbitration features.

The user arbitration is a function which includes interactions between the WSCP and the RWS and between the non-safety-critical and safety-critical SW.

The user requests access (or control) over an RWS.

The arbitration logic decides whether to grant access or not.

If access is granted:
The current connection is closed
The requesting WSCP is informed of the acceptance
On the RWS: The destination IP address of the IPsec tunnel 542 is changed to the new user position
On the WSCP: The destination IP address of the IPsec tunnel 542 is set/changed to the RWS
The IPsec key is generated through local action (random number gen) on both ends combined with the Diffi-Hellmann Key exchange protocol.
The hash of the key is set for the IPsec tunnel 542 at both ends.
The tunnel 542 is operational and the barriers are connected.

In FIG. 11, the reference numerals denote the following elements:

1, 2, 3, 4 are references used in element 1124. 540: IP/Ethernet, 542 IPsec tunnel, 601: WSCP #n, 602: WSCP/Display #n, 603: Weapon Station #m, 604: Safety critical, 605: Non Safety critical, 610: Barrier Control Transport Circuit #1, 620: Barrier Control Transport Circuit #2, 660: IPsec Circuit, 670: Barrier Control Transport Circuit #1, 673: Weapon 1 Barrier Ctrl. 1, 680: Barrier Control Transport Circuit #2, 696: Weapon 1 Firing circuitry, 697: Weapon n Firing circuitry, 1102: Hash(Key), 1104: Gen Key, 1106:

DH, 1108: Exchange keys, 1110: Accept/reject, 1112: Request access (pos), 1114: Arbitrate: based on Priority and state accept or reject access, 1116: DH, 1118: Move (pos), 1120: Gen Key, 1122: Hash (Key), 1124: If accept: 1. Close current connection; 2. Change IP addr; 3. Change Keys, 4. Open new connection.

Figure 12:
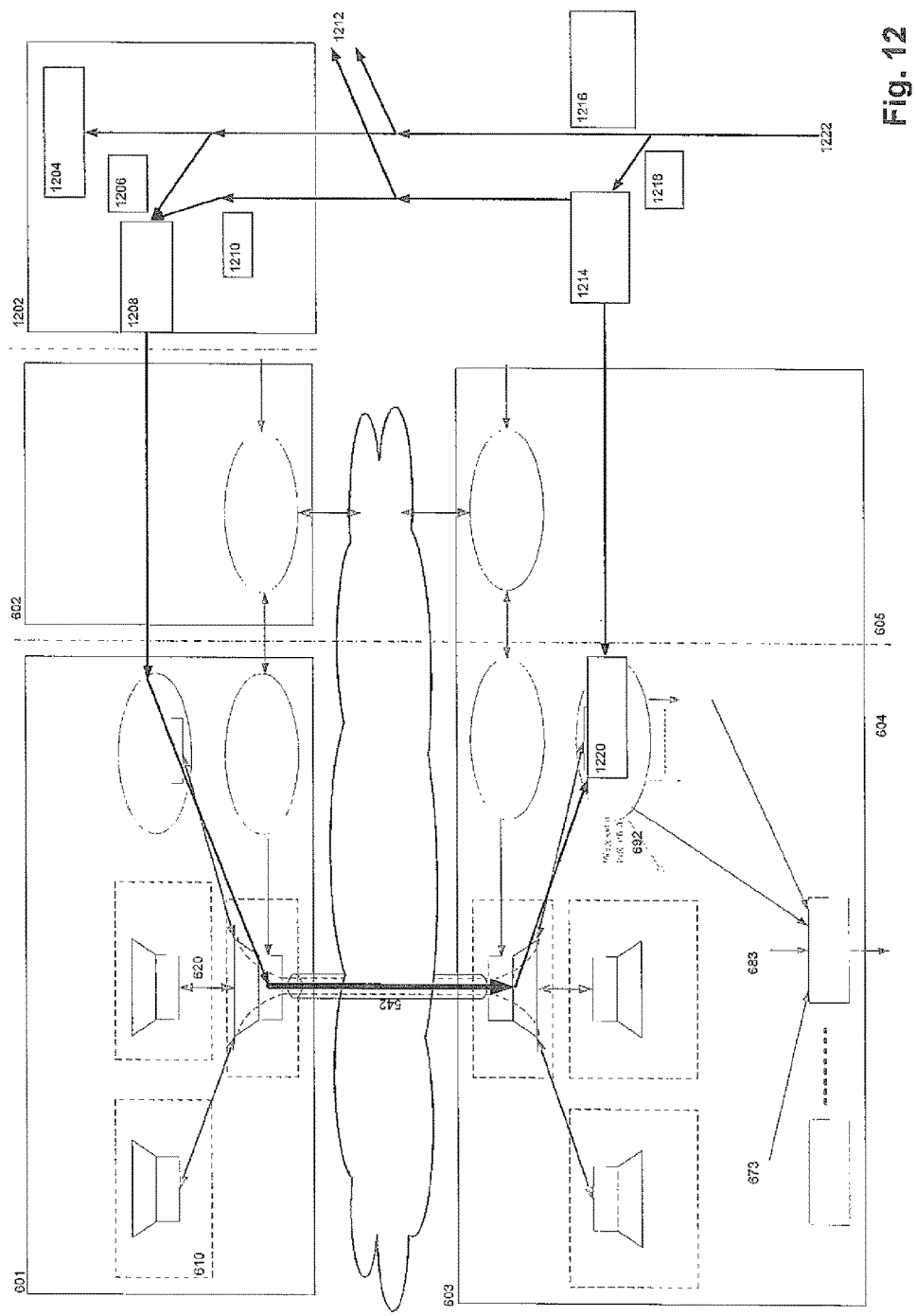
FIG. 12 is a schematic block diagram illustrating an exemplary system employing principles of the invention, including video distribution.

FIG. 12 is a schematic block diagram illustrating an exemplary system employing principles of the invention, including video distribution.

Video data may be distributed to the user screen(s) by some standardized or proprietary communication means and protocol. The video may be distributed with an identification of the video stream (e.g. SAP/SDP protocols for DEF-STAN 00-82). The session id is fed back to the MPU through the video session id function. The video confirmation function in the MPU compares the id of the distributed video with the received video id and thus confirms that the user views the correct video for the control of the safety critical functions.

In FIG. 12, the reference numerals denote the following elements:
542 IPsec tunnel, 601: WSCP #n, 602: WSCP/Display #n, 603: Weapon Station #m, 604: Safety critical, 605: Non Safety critical, 610: Barrier Control Transport Circuit #1, 620: Barrier Control Transport Circuit #2, 673: Weapon 1 Barrier Ctrl. 1, 683: Weapon 1 Barrier Ctrl. 2, 692: Weapon n Fire break, 1202: Display unit, 1204: Displayed video, 1206: Source IP Addr, 1208: Session ID:—Seq no.;—Source IP addr, 1201: Seq No., 1212: Other Display units, 1214: SAP. Session ID;—Seq. no.;—Source IP Addr, 1216: Encapsulate e.g. DEF-STAN 00.82, 1218: Source IP Addr, 1220: Verify Correct video on display, 1222: Video. FIG. 13 is a schematic block diagram illustrating aspects relating to the modification of a previous system to include principles of the invention.

Migration from Previous Designs

The system and method may advantageously be enabled to reuse safety mechanisms and barriers already present in an existing or previous system. It may also be made so as to reuse the same BCTC HW and SW components for independent safety critical functions, e.g. use BCTC#1 for both movement and missile firing.

FIG. 13 illustrates how the presently disclosed system may be achieved by inserting novel elements and/or features between existing firing and movement barriers. The existing barriers between the firing control and the firing circuitry may be bridged over a packet based network 540.

In FIG. 13, the further reference numerals denote the following elements: 540: IP/Ethernet, 1302: Fire control, 1304: Movement control, 1306: Weapon Firing circuitry, 1308: Weapon Movement circuitry, 1310: Old solution, 1312: New solution, 1314: SEL, 1320: Safety barriers over packed based networks, 1330: Safety barriers over packed based networks.

FIG. 14 is a schematic block diagram illustrating two barrier multiplexers.

Multiplexers of the type shown here should advantageously be designed as independent functions so as to maintain independence between the barriers.

In FIG. 14, the reference numerals denote the following elements: 1402 Packet barriers 1, 1404: Barrier Control Transport Circuit #1, 1406: RTP/UDP IP addr y, 1408: Hardwired barriers 1, 1410: Barrier #1 Sel Packet/HW, 1412: Weapon n Barrier 1, 1414: Weapon 1 Barrier 1, 1422 Packet barriers 2, 1424: Barrier Control Transport Circuit #2, 1426: RTP/UDP IP addr y+1, 1428: Hardwired barriers 2, 1430: Barrier #2 Sel Packet/HW, 1432: Weapon n Barrier 2, 1434: Weapon 1 Barrier 2.

The disclosed system and method may provide numerous advantages, including at least one of the following:
- Provides separate barriers as required by the safety community
- May be applied to existing hard-wired solutions—easy migration of existing solutions
- Combines supervision and information transfer—low and controllable bandwidth
- Is tailorable to response times and bandwidth
- May be transported over standard IP networks with standard protocols
- Provides a safe mechanism for multiuser configurations
- Barriers may be reused for multiple functions—reduces cost and complexity
- Provides a total solution for safety critical systems
- Is a simple HW solution—simple addressing and information transfer
- Few and well defined safety critical components
- No synchronization required between MPU and WSCP (no common and accurate Time Of Day)
- Good supervision for faults
- Immediate response to change (first change in a TS)
- Predictable worst case response
- May be tailored to run on low quality networks (high packet loss)
- May be combined with networks according to ongoing standardization (GVA, DEF-STAN 00-82)
- May be applied to a large variety of applications Although the invention has been described by example for control of weapons, the skilled person will readily understand that the system and method may have a more general application area, and that remotely controlled weapon stations have been mentioned merely as an illustrative example of conceivable safety-critical devices. The principles of the invention may thus be applied to any safety critical field, e.g. control of industrial or scientific processes, power plants or remotely operated oil-wells.

ACRONYMS AND ABBREVIATIONS

CRC Cyclic Redundancy Check
IPSEC Internet Protocol SECurity
KPS Kongsberg Protector Systems
MPU Main Processin Unit—The controlling unit in a RWS system
RTP Real Time Protocol
RWS Remotely operated Weapon Station
SAP Session Announcement Protocol
SDP Session Description Protocol
TCP Transmission Datagram Protocol
TS Time Slot
UDP User Datagram Protocol
WSCP Weapon Station Control Panel

The invention claimed is:

1. A system for operating, at a near location, a safety-critical device located at a far location distant from the near location, the system comprising:
a first operating input device that generates a first barrier control signal, the first operating input device to be operated at the near location by an operator;
a second operating input device that generates a second barrier control signal, the second operating input device to be operated at the near location by an operator;
a third operating input device that generates a third barrier control signal, the third operating input device to be operated at the near location by an operator;
a first barrier circuit at the far location;

a second barrier circuit, different from said first barrier circuit, at the far location; and
a third barrier circuit, different from said first and second barrier circuits, at the far location,
the first operating input device being communicatively connected to a near end of a first secure communication tunnel through a non-secure communication network,
the second operating input device being communicatively connected to a near end of a second secure communication tunnel, different from the first secure communication tunnel, through the non-secure communication network,
the third operating input device being connected to a near end of a third secure communication tunnel through the non-secure communication network,
a far end of the first secure communication tunnel being communicatively connected to an activating input of the first barrier circuit, the first barrier circuit being activated upon receipt of the first barrier control signal from the first operating input device via the first secure communication tunnel,
a far end of the second secure communication tunnel being communicatively connected to an activating input of the second barrier circuit, the second barrier circuit being activated upon receipt of the second barrier control signal from the second operating input device via the second secure communication tunnel,
a far end of the third secure communication tunnel being connected to an activating input of the third barrier circuit, the third barrier circuit being activated upon receipt of the third barrier control signal from the third operating input device via the third secure communication tunnel,
the first, second, and third barrier circuits being configured to enable operation of the safety-critical device when all of the first, second, and third barrier circuits are activated by the respective first, second, and third barrier control signals, and
the first and second barrier circuits being implemented by separate respective hardware circuits, the first barrier circuit responsive to signals received from the first secure communication tunnel, and the second barrier circuit responsive to signals received from the second secure communication tunnel.

2. The system according to claim 1, further comprising:
a first multiplexer that multiplexes a plurality of first barrier control signals onto the first secure communication tunnel through the non-secure communication network;
a second multiplexer that multiplexes a plurality of second barrier control signals onto the second secure communication tunnel through the non-secure communication network;
a first demultiplexer at the first barrier circuit that demultiplexes the plurality of first barrier control signals received through the first secure communication tunnel; and
a second demultiplexer at the second barrier circuit that demultiplexes the plurality of second barrier control signals received through the second secure communication tunnel.

3. The system according to claim 1, wherein the non-secure communication network is a packet-based communication network.

4. The system according to claim 3, wherein the non-secure communication network is an Internet Protocol (IP) network and the first and second secure communication tunnels are Internet Protocol security (IPSec) tunnels.

5. The system according to claim 3, wherein communication through the first and second secure communication tunnels employ a protocol which includes time-stamping of data.

6. The system according to claim 4, wherein the system is configured with a fixed IP addressing scheme.

7. The system according to claim 1, wherein the safety-critical device includes at least one of a weapon firing circuitry, a weapon movement circuitry, and a video confirmation device.

8. The system according to claim 1, wherein at least one of the first and second operating input device includes at least one of:
a weapon fire control device, a weapon movement control device, and a video session information device.

9. The system according to claim 1,
wherein at least one of the first and second operating input device includes a video session information device,
wherein the safety-critical device includes a video confirmation device, and
the system further comprises a video distribution device that generates a video signal that is transmitted through the non-secure communication network for display on a screen at the near location,
the video session information device configured to derive video session information from the video signal and to transfer the video session information through a secure communication tunnel, and
the video confirmation device being configured to confirm an authenticity of the video signal transferred through the non-secure communication network.

10. A method for operating, at a near location, a safety-critical device located at a far location distant from the near location, the method comprising:
providing a first operating input device operable at the near location by a first operator, the first operating input device communicably connected to the safety-critical device via a non-secure communication network, and the first operating input device configured to generate a first barrier control signal;
providing a second operating input device operable at the near location by a second operator, the second operating input device communicably connected to the safety-critical device via the non-secure communication network, and the second operating input device configured to generate a second barrier control signal;
providing a third operating input device operable at the near location by a third operator, the third operating input device communicably connected to the safety-critical device via the non-secure communication network, and the third operating input device configured to generate a third barrier control signal;
transmitting the first barrier control signal to a near end of a first secure communication tunnel through the non-secure communication network to a far end of the first secure communication tunnel;
transmitting the second barrier control signal to a near end of a second secure communication tunnel, different from the first secure communication tunnel, through the non-secure communication network to a far end of the second secure communication tunnel;
transmitting the third barrier control signal to a near end of a third secure communication tunnel through the non-secure communication network to a far end of the third secure communication tunnel;

transmitting, upon receipt of the first barrier control signal from the first operating input device via the first secure communication tunnel, a first activation signal from a far end of the first secure communication tunnel to an activating input of a first barrier circuit;

transmitting, upon receipt of the second barrier control signal from the second operating input device via the second secure communication tunnel, a second activation signal from a far end of the second secure communication tunnel to an activating input of a second barrier circuit;

transmitting, upon receipt of the third barrier control signal from the third operating input device via the third secure communication tunnel, a third activation signal from a far end of the third secure communication tunnel to an activating input of a third barrier circuit; and upon receipt of the first, second, and third activation signals, enabling operation of the safety-critical device, wherein the first and second barrier circuits are implemented by separate respective first and second hardware circuits, the first hardware circuit configured to respond to signals received from the first secure communication tunnel, and the second hardware circuit configured to respond to signals received from the second secure communication tunnel.

11. The method according to claim 10, further comprising:

multiplexing, by a first multiplexer, a plurality of first barrier control signals onto the first secure communication tunnel through the non-secure communication network;

multiplexing, by a second multiplexer, a plurality of second barrier control signals onto the second secure communication tunnel through the non-secure communication network;

demultiplexing, by a first demultiplexer at the first barrier circuit, the plurality of first barrier control signals from the first barrier circuit; and demultiplexing, by a second demultiplexer at the second barrier circuit, the plurality of second barrier control signals from the second barrier circuit.

12. The method according to claim 10, wherein the non-secure communication network is a packet-based communication network.

13. The method according to claim 12, wherein the non-secure communication network is an Internet Protocol (IP) network and the first and second secure communication tunnels are Internet Protocol security (IPSec) tunnels.

14. The method according to claim 12, wherein the communication through first and second the secure communication tunnels employ a protocol which includes time-stamping of data.

15. The method according to claim 13, wherein the method employs a fixed IP addressing scheme.

16. The method according to claim 10, wherein the safety-critical device includes at least one of a weapon firing circuitry, a weapon movement circuitry, and a video confirmation device.

17. The method according to claim 10, wherein at least one of the first and second operating input device includes at least one of:

a weapon fire control device, a weapon movement control device, and a video session information device.

18. The method according to claim 10, wherein at least one of the first and second operating input devices include a video session information device, wherein the safety-critical device includes a video confirmation device, and the method further comprises:

generating, by a video distribution device, a video signal;

transmitting the video signal through the non-secure communication network;

receiving the video signal at a screen at the near location and displaying content of the video signal thereon;

deriving, by the video session information device, video session information from the received video signal;

transmitting the video session information through a secure communication tunnel to the video confirmation device; and confirming, at the video confirmation device, an authenticity of the video signal.

* * * * *